United States Patent [19]

Harada et al.

[11] 3,957,717

[45] May 18, 1976

[54] ORGANOPOLYSILOXANE COMPOSITIONS

[75] Inventors: Naohiko Harada; Masaki Tanaka, both of Annaka, Japan

[73] Assignee: Shin-Etsu Chemical Co., Ltd., Tokyo, Japan

[22] Filed: Apr. 4, 1975

[21] Appl. No.: 565,209

[30] Foreign Application Priority Data

Apr. 8, 1974   Japan.............................. 49-39650

[52] U.S. Cl. ..................... 260/37 SB; 260/46.5 UA
[51] Int. Cl.² ......................................... C08L 83/04
[58] Field of Search ................ 260/37 SB, 46.5 UA, 260/825

[56] References Cited
UNITED STATES PATENTS

| | | | |
|---|---|---|---|
| 3,057,469 | 10/1962 | Bond et al. | 260/825 X |
| 3,527,659 | 9/1970 | Keil | 260/825 X |
| 3,539,530 | 11/1970 | Karstedt | 260/46.5 UA UX |

*Primary Examiner*—Lewis T. Jacobs
*Attorney, Agent, or Firm*—Toren, McGeady and Stanger

[57] ABSTRACT

Organopolysiloxane compositions comprising cyclic diorganosiloxane polymers containing at least two silicon-bonded unsaturated hydrocarbon groups per molecule, organopolysiloxanes composed of the triorganosiloxy and $SiO_2$ groups, and organohydrogenpolysiloxanes containing at least two silicon-bonded hydrogen atoms per molecule, including platinum catalysts, and fillers are disclosed. Cured products prepared from these materials are safe from cracking and possess excellent mechanical properties as well as very low moisture permeability. The compositions are suitable for various fields of applications including encapsulation of electronic parts.

14 Claims, No Drawings

ORGANOPOLYSILOXANE COMPOSITIONS

FIELD OF THE INVENTION

The present invention relates to an organopolysiloxane composition curable at mild temperatures and suitable for several applications such as casting.

DESCRIPTION OF THE PRIOR ART

In the prior art, are known several types of organopoylsiloxane compositions curable at room temperature or a slightly elevated temperature and suitable for casting and other applications. They include an organosiloxane polymer composed of the units expressed by $RSiO_{1.5}$ and an organosiloxane copolymer composed of three kinds of the organosiloxane units expressed by $RSiO_{1.5}$, $R_2SiO$ and $R_3SiO_{0.5}$ where R is selected from substituted or unsubstituted monovalent hydrocarbon groups (see, e.g. U.S. Pat. 3,631,220). These organopolysiloxanes are prepared by the hydrolysis of mixed organochlorosilanes followed by the condensation-polymerization of the silanol group-containing hydrolyzates. It is therefore inevitable that more or less of the silanol groups remain in the organopolysiloxane leading to undesirable bubble formation inside the cured products due to the hydrogen gas or water vapor produced by the dehydrogenation or dehydration in the course of curing of the composition, even in the case where the curing proceeds by the mechanism of addition reaction. On the other hand, an organopolysiloxane for such a composition has been proposed into which large amount of phenyl groups are introduced as part of the organic groups R in the above-mentioned siloxane units in order to improve the mechanical strength of the cured products although the curability of such an organopolysiloxane composition is very poor so as that no curing is obtained at room temperature or curing is retarded even at high temperatures.

Furthermore organopolysiloxane compositions suitable for these purposes are known which comprise a linear-chain organopolysiloxane composed of $R_2SiO$ units where R has the same meaning as above and which are terminated at both chain ends by vinyl groups directly bonded to the silicon atoms, an organohydrogenpolysiloxane and a platinum compound (see U.S. Pat. No. 2,823,218). Such a composition becomes readily cured even at room temperature without gas evolution but the cured products obtained from it are defective in that they are brittle with poor mechanical strength and possess relatively high permeability to water vapor or other gases. In addition, although thin-walled products can be obtained without cracking from such an organopolysiloxane composition with increased crosslinking density whereas cracks inevitably form in the cured products when thick-walled products are made by casting or dipping.

SUMMARY OF THE INVENTION

The object of the present invention is to present an organopolysiloxane composition free from the above-described defects and the organopolysiloxane composition comprises a. a cyclic diorganosiloxane polymer represented by the general formula

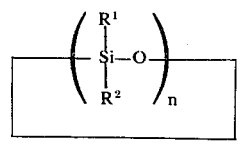

where $R^1$ and $R^2$ each are selected from substituted or unsubstituted monovalent hydrocarbon groups and $n$ is an integer from 3 to 5 and containing at least two unsaturated hydrocarbon groups in a molecule, b. an organopolysiloxane composed of $R_3^3SiO_{0.5}$ units and $SiO_2$ units in a ratio of from 0.6 to 1.2 moles of $R_3^3SiO_{0.5}$ per mole of $SiO_2$ where $R^3$ is a monovalent hydrocarbon group, at least 60 % in number thereof being methyl groups, c. a liquid organohydrogenpolysiloxane represented by the average unit formula

where $R^4$ is a substituted or unsubstituted monovalent hydrocarbon group, $a$ is a positive number from 1 to 2 and $b$ is a positive number from 0.1 to 1.2 with the proviso that $1.8 \leq (a + b) \leq 3.0$ and containing at least two hydrogen atoms directly bonded to the silicon atoms in a molecule in an amount which is sufficient to give from 0.5 to 2.0 hydrogen atoms directly bonded to the silicon atoms per one unsaturated hydrocarbon group in the components (a) and (b), d. a catalytic amount of platinum or a platinum compound, and e. a filler, the amount of said component (b) being in the range of from 20 to 500 parts by weight per 100 parts of the total weight of said components (a) and (c) and the amount of said filler being in the range of from 10 to 500 parts by weight per 100 parts of the total weight of said components (a), (b) and (c).

DETAILED DESCRIPTION OF THE INVENTION

To describe the invention in further detail, the organopolysiloxane composition comprising the components (a) to (e) as specified above has a widely varied consistency from a high fluidity to putty-like consistency and is curable at room temperature within 24 hours or at 70°C within about two hours to give a cured product wih elasticity and excellent mechanical strength as well as low permeability to moisture and of freedom from cracks. The cured products obtained from the composition with high fluidity are free from bubbles and the composition is advantageously applicable for use in total embedding or impregnation of electronic devices in which the electronic devices or electronic parts are placed in an appropriate container and the void space between the electronic devices or parts and the walls of the container is filled up with the fluid composition followed by the curing of the composition into a cured body. The composition with a putty-like consistency is useful for moisture-proof sealing or caulking. The component (a) in the composition of the present invention is a liquid compound of a cyclic diorganosiloxane polymer as represented by the general formula (I) above and it is necessary that the component (a) have at least two unsaturated hydrocarbon groups in a molecule in order to give the advantages of the present invention. Preferably, the component (a) has a viscosity lower than 100 centipoise at 25°C. In the formula (I) above, the sysmbols $R^1$ and $R^2$ denote substituted or unsubstituted monovalent hydrocarbon groups, including alkyl groups, such as, methyl, ethyl, and propyl groups, alkenyl groups, such as, vinyl and allyl groups and aryl groups such as phenyl and their halogen-substituted derivatives and n is an integer from 3 to 5.

Specifically useful cyclic diorganosiloxane polymers as component (a) have the general formula

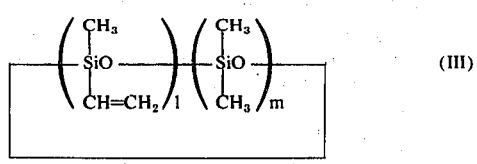

where $l$ is 3 or 4 and $m$ is an interger from 0 to 1, and are exemplified by tetravinyltetramethylcyclotetrasiloxane, trivinyltrimethylcyclotrisiloxane, 1,3,5-trivinyl-1,3, 5,7,7-pentamethylcyclotetrasiloxane, 1,5-divinyl-1,3,3, 5,7,7-hexamethylcyclotetrasiloxane and 1,5-divinyl-3,7-diphenyl-1,3,5,7-tetramethylcyclotetrasiloxane.

The organopolysiloxane as the component (b) serves to prevent crack formation in the cured products obtained from the composition of the present invention. The component (b) is composed of siloxane units expressed by the general formula $R_3^3SiO_{0.5}$ and siloxane units expressed by the formula $SiO_2$ with the molar ratio of the $R_3^3SiO_{0.5}$ units to the $SiO_2$ units in the range from 0.6:1 to 1.2:1. The symbol $R^3$ in the above general formula denotes a monovalent hydrocarbon group, such as, methyl, ethyl, propyl, vinyl, allyl and phenyl, and the $R_3^3SiO_{0.5}$ unit is exemplified by $(CH_2=CH)(CH_3)_2 SiO_{0.5}$, $(CH_3)_3SiO_{0.5}$, $(CH_2=CH-CH_2)(CH_3)_2SiO_{0.5}$ and $(CH_3)(C_6H_5)_2SiO_{0.5}$. These units may be combined with the $SiO_2$ units either singly or in combination but it is necessary that at least 60 %, in number, of the total hydrocarbon groups are methyl groups. It is also preferable that at least 3 %, in number, of the hydrocarbon groups are vinyl groups in order to give decreased tackiness of the surface of the cured products.

The amount of the component (b) is necessarily in the range from 20 to 500 parts by weight per 100 parts of the total weitht of the components (a) and (c). An amount smaller than 20 parts by weight of the component (b) results in the crack formation in the cured products with large wall thickness while an amount larger than 500 parts by weight of the component (b) does not give sufficient fluidity to the composition of the present invention.

The component (c) is represented by the average unit formula (II) above and it is an organohydrogenpolysiloxane fluid with at least two hydrogen atoms directly bonded to the silicon atoms in a molecule. The symbol $R^4$ in the formula denotes unsubstituted monovalent hydrocarbon groups, such as, alkyl groups exemplified by methyl, ethyl and propyl groups, alkenyl groups exemplified by vinyl and allyl groups and aryl groups exemplified by phenyl and their halogen substituted derivatives. The symbol $a$ is a positive number from 1 to 2 and $b$ is also a positive number from 0.1 to 1.2, or preferably, from 0.5 to 1.2, with the proviso that $a + b$ is in the range from 1.8 to 3.0. Suitable as the component (c) are several types of the organohydrogenpolysiloxanes with at least two silicon-bonded hydrogen atoms including diorganopolysiloxanes composed of $CH_3HSiO$ units and/or $(CH_3)_2SiO$ units and terminated at both chain ends by dimethylhydrogensilyl groups or trimethylsilyl groups, a low-viscosity siloxane fluid composed of dimethylhydrogensiloxane units and $SiO_2$ units and cyclic siloxanes, such as, tetrahydrogentetramethylcyclotetrasiloxane and 1-α-methylstyryl-3,5,7-trihydrogen-1,3,5,7-tetramethylcyclotetrasiloxane. With respect to the structural configuration of these compounds, they may be any one of the linear-chain, branched-chain and cyclic-chain siloxanes as is clear from the above disclosure. Component (c) is necessarily employed in an amount sufficient to give 0.5 to 2.0 of the silicon-bonded hydrogen atoms per one vinyl group directly bonded to the silicon atom in the components (a) and (b). Larger amounts of component (c) than specified above lead to the crack formation in the cured products due to the evolution of hydrogen gas and also to lowering in the elasticity of the cured products.

The platinum catalyst as component (d) is employed for the purpose of accelerating the addition reaction between component (c) and component (a) or (b). Any one of the known platinum catalysts is suitable for the purpose, including finely-divided metallic platinum, chloroplatinic acid, complexes of chloroplatinic acid with olefinic hydrocarbons and several of the coordination compounds of platinum. The planinum catalyst is employed in an amount of from 1 to 500 p.p.m. as platinum based on the total weight of the siloxane components (a), (b) and (c).

The filler used as component ($l$) of the present invention is employed in an amount of from 10 to 500 parts by weight per 100 parts of the total weight of the components (a), (b) and (c). Several of the examples of the filler suitable as component (e) include powdery inorganic fillers, such as, siliceous fillers exemplified by finely-powdered quartz, finely-powdered fused quartz, silica hydrogels, silica aerogels, calcium silicate and aluminum silicate, metal oxides exemplified by titanium dioxide, alumina, zinc oxide and iron oxide, carbonaceous fillers exemplified by carbon black and graphite, calcium carbonate, mica and clays, fibrous materials exemplified by glass fiber, polyester fiber and nylon fiber, and inorganic spherical bodies exemplified by glass beads and hollow glass spheres.

If necessary, the composition of the present invention may contain several additives known in the art, such as, pigments, thermal-stability improvers and flame retardants. The amounts of these additives are not limiting as long as no adverse effects occur due to their incorporation.

The composition of the present invention is prepared by merely blending the components (a) to (e). For the purpose of shipping or storing, however, a two-package formulation is advantageous in which the components are divided into two groups for the two packages and the contents of the two packages are blended just prior to use. Several ways are possible for dividing the components into two groups, but it is generally recommended that the components (a), (b), (d) and (e) are blended into the first package and component (c) is made into second package.

The composition of the present invention thus prepared has a widely varied consistency from high fluidity to a putty-like consistency and is curable at a temperature in the range from room temperature to 100°C to give a cured products with elasticity.

The following examples are to illustrate the present invention and all parts in the examples are all parts by weight. The data for the moisture permeability were determined according to the method as described in JIS (Japanese Industrial Standard) Z 0208.

EXAMPLE 1

100 parts of tetravinyltetramethylcyclotetrasiloxane, 100 parts of trimethylsilyl-endblocked methylhydrogenpolysiloxane (viscosity: 30 centipoise at 25°C), 600 parts of quartz flour (average diameter of particle: 15 um), 200 parts of methylvinylpolysiloxane copolymer consisting of (a) the $(CH_2=CH)(CH_3)_2SiO_{0.5}$ units, (b) the $(CH_3)_3SiO_{0.5}$ units, and (c) the $SiO_2$ unit, the molar ratio of units (a) and (b) to unit (c) being 1:1 and unit (a)/unit (b) being 1/4, and 0.4 part of a solution of chloroplatinic acid in octyl alcohol (platinum concentration: 2% by weight) were mixed together uniformly. The resultant mixture, having a viscosity of 80 poise at 25°C, was introduced into an aluminum schale (inner diameter: 60 mm; depth: 60 mm) equipped with a resistor, and then heated at 100°C for 1 hour, to produce a cured product with no crack, having the following physical properties.

| | |
|---|---|
| Hardness | Shore D 65 |
| Flexual strength | 2.0 kg/mm² |
| Moisture permeability | 12 g, mm/m², hr. |

CONTROL 1

100 parts of tetravinyltetramethylcyclotetrasiloxane, 100 parts of trimethylsilyl-terminated methylhydrogenpolysiloxane (viscosity: 30 centipoise at 25°C), 0.2 part of a solution of chloroplatinic acid in octyl alcohol (platinum concentration: 2% by weight) were mixed together with stirring. The resultant mixture (viscosity: 15 centipoise at 25°C) was poured into an aluminum schale (inner diameter: 60 mm; depth: 3 mm), and then heated at 70°C for 2 hours. The thus cured product was found to have many cracks and to be unusable. Its hardness was Shore D 60.

EXAMPLE 2

To the starting mixture of Control 1 was added 400 parts of quartz flour. The resultant mixture having a viscosity of 10 poise at 25°C was poured into a similar aluminum schale and allowed to stand for 2 hours at 70°C, to produce which a light grey product cured with no crack. Separately, the same mixture was poured into a schale (inner diameter: 60 mm; depth: 60 mm) equipped with a ceramic column (diameter: 10 mm; length: 50 mm), and heated at 100°C for 2 hours, to give a cured product having cracks, which was found to be unusable. Its hardness was Shore D 70.

EXAMPLES 2 and 3

Each polysiloxane named in the following Table I as component (a) in accordance with this invention, the same methylhydrogenpolysiloxane as used in Example 1 as component (c), a methylpolysiloxane copolymer as component (b), consisting of the $(CH_3)_3SiO_{0.5}$ and $SiO_2$ units, the molar ratio of the former unit to the latter unit being 0.75, and quartz flour were mixed in amounts respectively indicated in Table I together with 0.4 part of a solution of chloroplatinic acid in octyl alcohol (platinum concentration: 2% by weight). Each of the resultant mixtures was heated to 100°C for 1 hour, to obtain a cured sheet 2 mm thick, having the various physical properties as set out in the same table.

For the purpose of comparison, similar tests were carried out using chain polysiloxanes. The details and results of the control tests are set out also in Table I.

Table I

| | Example 2 | Example 3 | Control 3 | Control 4 |
|---|---|---|---|---|
| Polysiloxane, as component (a), and amount, parts | Tetravinyltetramethylcyclotetrasiloxane, 100 | Trivinyltrimethylcyclotrisiloxane, 100 | Chain vinylmethylpolysiloxane, 100 | Chain dimethylpolysiloxane, 100 |
| Amount of methylhydrogenpolysiloxane, parts | 100 | 100 | 22 | 3 |
| Amount of polysiloxane copolymer, parts | 200 | 200 | 244 | 206 |
| Amount of quartz flour, parts | 400 | 400 | 488 | 412 |
| Viscosity of mixture, poise at 25 degrees C | 40 | 45 | 50 | 500 |
| Product: | | | | |
| Moisture permeability, g,mm/sq.m,hr. | 16 | 15 | 28 | 47 |
| Hardness, Shore | D 60 | D 55 | A 90 | A 60 |
| Flexual strength kg/sq.mm | 1.5 | 1.5 | — | — |
| Tensile strength, kg/sq.cm | — | — | 30 | 30 |

Notes to Table I:
(1) The chain vinylmethylpolysiloxane used in Control 3 consists of 20 mole % of the $(CH_2=CH)(CH_3)SiO$ units and 80 % of the $(CH_3)_2SiO$ and has trimethylsilyl groups at both chain ends. Its viscosity is 50 centipoise at 25°C.
(2) The chain dimethylpolysiloxane used in Control 4 has vinyldimethylsilyl groups at both chain ends. Its viscosity is 100 centipoise at 25°C.

EXAMPLES 4–7

100 parts of tetravinyltetramethylcyclotetrasiloxane as component (a) in accordance with this invention were added to a mixture of organohydrogenpolysiloxane as component (c), the same methylpolysiloxane copolymer as used in Example 2, and quartz flour in amounts respectively specified in the following Table II. To the resultant mixture was further added 0.4 part of a solution of chloroplatinic acid in octyl alcohol (platinum concentration: 5% by weight), followed by heating at 100°C for 1 hour. The products exhibited their physical properties as set out in the same table.

Example 8, and allowed to cure at 50°C for 8 hours. The molded product thus obtained was found to have no cracks, but to be inferior in quality with respect to the following physical properties.

Table II

|  | Example 4 | Example 5 | Example 6 | Example 7 |
|---|---|---|---|---|
| Organohydrogen-polysiloxane, and amount, parts | Tetrahydrogen-tetramethylcyclo-tetrasiloxane,100 | Organohydrogen-polysiloxane, 150 | Organohydrogen-polysiloxane, 250 | Organohydrogen-polysiloxane, 1,250 |
| Amount of polysiloxane copolymer, parts | 200 | 250 | 350 | 1,350 |
| Amount of quartz flour, parts | 400 | 500 | 700 | 2,700 |
| Viscosity of mixture, poise at 25°C | 35 | 150 | 70 | 50 |
| Product: |  |  |  |  |
| Moisture permeability, g.mm/sq.m,hr. | 15 | 20 | 29 | 43 |
| Hardness, Shore | D 55 | D 50 | A 80 | A 60 |
| Flexual strength kg/sq.mm | 1.5 | 2.0 | — | — |
| Tensile strength, kg/sq.cm | — | — | 25 | 15 |

Notes to Table II:
(1) The organohydrogenpolysiloxane used in Example 5 consists of the $(CH_3)_2HSiO_{0.5}$ and $SiO_2$ units, the molar ratio of the former units to the latter being 1.8. Its viscosity is 50 centipoise at 25°C.
(2) The organohydrogenpolysiloxane used in Example 6 consists of 40 mole % of the $(CH_3)HSiO$ unit and 60 mole % of the $(CH_3)_2SiO$ unit, having both chain ends terminated with trimethylsilyl groups. Its viscosity is 90 centipoise at 25°C.
(3) The organohydrogenpolysiloxane used in Example 7 is dimethylpolysiloxane terminated with dimethylhydrogensilyl groups at both chain ends. Its viscosity is 25 centipoise at 25°C.

EXAMPLE 8

100 parts of 1,3,5-trivinyl-1,3,5,7,7-pentamethylcyclotetrasiloxane, 75 parts of tetrahydrogentetramethylcyclotetrasiloxane, 100 parts of the same methylvinylpolysiloxane copolymer, 200 parts of quartz flour, and 1 part of a solution of chloroplatinic acid in octyl alcohol were mixed together, to make a uniform mixture, having a viscosity of 30 poise at 25°C. This mixture was poured into a cubic vessel, 60 mm long, 60 mm wide and 60 mm deep, and allowed to cure at 50°C for 8 hours. The molded article thus produced had the following properties.

| Hardness | Shore A 90 |
|---|---|
| Tensile strength | 30 kg/cm² |
| Moisture permeability | 15 g,mm/m²,hr. |

CONTROL 5

100 parts of 1,3,5-trivinyl-1,3,5,7,7-pentamethylcyclotetrasiloxane, 75 parts of tetrahydrogentetramethylcyclotetrasiloxane, 200 parts of quartz flour, and 1 part of a solution of chloroplatinic acid in octyl alcohol (platinum concentration: 2% by weight) was mixed together to make a uniform mixture having a viscosity of 15 poise at 25°C. This mixture was poured into the same vessel as used in Example 8, and allowed to cure at 50°C over a period of 8 hours. The cured product thus obtained was found to have cracks and to be unusable. Its hardness was Shore D 55.

CONTROL 6

The same procedure as in Example 8 excepting that the methylvinylpolysiloxane copolymer was replaced by a vinyldimethylsilyl-endblocked dimethylsiloxane gum having a polymerization degree of 8,000, to make a mixture, having a viscosity of 400 poise at 25°C. This mixture was poured into the same vessel as used in Example 8, and allowed to cure at 50°C for 8 hours. The molded product thus obtained was found to have no cracks, but to be inferior in quality with respect to the following physical properties.

| Hardness | Shore A 60 |
|---|---|
| Tensile strength | 20 kg/cm² |
| Moisture permeability | 45 g,mm/m²,hr. |

EXAMPLE 9

100 parts of tetramethyltetravinylcyclotetrasiloxane, 200 parts of 1,α-methylstylyl3,5,7-trihydrogen-1,3,5,7-tetramethylcyclotetrasiloxane, 200 parts of the same methylvinylpolysiloxane copolymer as used in Example 1, 600 parts of finely divided glass fiber (average length and diameter of filaments: 0.5 mm and 9 μm, respectively), and 0.5 part of a solution of chloroplatinic acid in octyl alcohol (platinum concentration: 5% by weight) were mixed together to make a uniform mixture, having a viscosity of 400 poise at 25°C. This mixture was poured into a case enclosing a ceramic resistor, a condenser, and a diode, and allowed to cure at 70°C over a period of 2 hours, to obtain a cured product with no cracks, having the following physical properties

| Hardness | Shore D 55 |
|---|---|
| Flexual strength | 2 kg/mm² |
| Moisture permeability | 15 g,mm/m²,hr. |

EXAMPLE 10

100 parts of tetramethyltetravinylcyclotetrasiloxane, 100 parts of the same methylhydrogenpolysiloxane as used in Example 1, 300 parts of the same methylvinylpolysiloxane copolymer as used in Example 1, 0.4 part of a chloroplatinic acid solution in octyl alcohol (platinum concentration: 2% by weight), and 500 parts of quartz flour were mixed together to make a uniform mixture, having a viscosity of 70 poise at 25°C. This mixture was poured into the same vessel as used in Example 1, and allowed to cure as in Example 9, to obtain a cured product with no crack, having the following properties.

| | |
|---|---|
| Hardness | Shore D 60 |
| Flexural strength | 1.5 kg/mm² |
| Moisture permeability | 15 g.mm/m².hr. |

What is claimed is:

1. An organopolysiloxane composition comprising (a) a cyclic diorganosiloxane polymer represented by the general formula

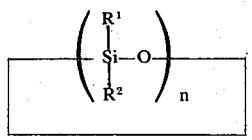

where $R^1$ and $R^2$ each are selected from substituted or unsubstituted monovalent hydrocarbon groups and n is an integer from 3 to 5 and containing at least two unsaturated hydrocarbon groups in a molecule, (b) an organopolysiloxane consisting of $R_3{}^3SiO_{0.5}$ and $SiO_2$ units in a ratio of from 0.6 to 1.2 moles of $R_3{}^3SiO_{0.5}$ per mole of $SiO_2$ where $R^3$ is a monovalent hydrocarbon group, at least 60% in number thereof being methyl groups, (c) a liquid organohydrogenpolysiloxane represented by the average unit formula

where $R^4$ is a substituted or unsubstituted monovalent hydrocarbon group, $a$ is a positive number from 1 to 2 and $b$ is a positive number from 0.1 to 1.2 with the proviso that $1.8 \leq (a + b) \leq 3.0$ and containing at least two hydrogen atoms directly bonded to the silicon atoms in a molecule in an amount sufficient to give from 0.5 to 2.0 hydrogen atoms directly bonded to the silicon atoms per one unsaturated hydrocarbon group in components (a) and (b), (d) a catalytic amount of platinum or a platinum compound, and (e) a filler, the amount of component (b) being in the range of from 20 to 500 parts by weight based on 100 parts by weight of components (a) and (c) and the amount of component (e) being in the range of from 10 to 500 parts by weight based on 100 parts by weight of components (a), (b), and (c).

2. The organopolysiloxane composition as claimed in claim 1 wherein component (a) is tetravinyltetramethylcyclotetrasiloxane.

3. The organopolysiloxane composition as claimed in claim 1 wherein component (a) is trivinyltrimethylcyclotrisiloxane.

4. The organopolysiloxane composition as claimed in claim 1 wherein component (a) is 1,3,5-trivinyl-1,3,5,7,7-pentamethylcyclotetrasiloxane.

5. The organopolysiloxane composition as claimed in claim 1 wherein component (b) is an organopolysiloxane copolymer consisting of the $(CH_3)_3SiO_{0.5}$ and $SiO_2$ units.

6. The organopolysiloxane composition as claimed in claim 1 wherein component (b) is an organopolysiloxane copolymer consisting of the $(CH_2=CH)(CH_3)_2SiO_{0.5}$, $(CH_3)_3SiO_{0.5}$, and $SiO_2$ units.

7. The organopolysiloxane composition as claimed in claim 1 wherein component (b) is present in an amount of from 50 to 200 parts by weight based on 100 parts by weight of components (a) and (c).

8. The organopolysiloxane composition as claimed in claim 1 wherein component (c) is a liquid methylhydrogenpolysiloxane terminated by trimethylsilyl groups at both chain ends.

9. The organopolysiloxane composition as claimed in claim 1 wherein component (c) is a liquid methylhydrogenpolysiloxane consisting of the $(CH_3)HSiO$ and $(CH_3)_2SiO$ units and terminated by trimethylsilyl groups at both chain ends.

10. The organopolysiloxane composition as claimed in claim 1 wherein component (c) is tetrahydrogentetramethylcyclotetrasiloxane.

11. The organopolysiloxane composition as claimed in claim 1 wherein component (c) is a liquid methylhydrogenpolysiloxane consisting of the $(CH_3)_2HSiO_{0.5}$ and $SiO_2$ units.

12. The organopolysiloxane composition as claimed in claim 1 wherein component (c) is a liquid dimethylpolysiloxane terminated by dimethylhydrogensilyl groups at both chain ends.

13. The organopolysiloxane composition as claimed in claim 1 wherein component (c) is 1-α-methylstyryl-3,5,7-trihydrogen-1,3,5,7-tetramethylcyclotetrasiloxane.

14. An organopolysiloxane composition comprising, (a) a cyclic diorganosiloxane polymer represented by the general formula

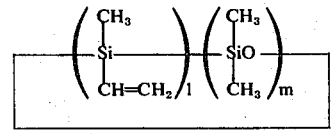

where $l$ is an integer of 3 or 4 and $m$ is an integer of 0 or 1, (b) an organopolysiloxane consisting of the $(CH_3)_3SiO_{0.5}$, $(CH_2=CH)(CH_3)_2SiO_{0.5}$, and $SiO_2$ units in a ratio of from 0.6 to 1.2 moles of $(CH_3)^3SiO_{0.5}$ and/or $(CH_2=CH)(CH_3)_2SiO_{0.5}$ per mole of $SiO_2$, at least 60% in number thereof being methyl groups (c) a liquid organohydrogenpolysiloxane represented by the average unit formula

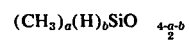

where $a$ is a positive number from 1 to 2 and $b$ is a positive number from 0.5 to 1.2 with the proviso that $1.8 \leq (a + b) \leq 3.0$ and containing at least two hydrogen atoms directly bonded to the silicon atoms in a molecule in an amount sufficient to give from 0.5 to 2.0 hydrogen atoms directly bonded to the silicon atoms per vinyl group in components (a) and (b), (d) a catalytic amount of platinum or a platinum compound, and (e) a filler, the amount of component (b) being in the range of from 50 to 200 parts by weight based on 100 parts by weight of components (a) and (c) and the amount of component (e) being in the range of from 10 to 500 parts by weight based on 100 parts by weight of components (a), (b), and (c).

* * * * *